United States Patent Office 3,751,447
Patented Aug. 7, 1973

3,751,447
NOVEL GUANIDINOCAPROIC ACID PHENYL
ESTERS AND THEIR PRODUCTION
Setsuro Fujii, Tokushima, and Tsuyoshi Watanabe, Nishinomiya, Japan, assignors to Ono Pharmaceutical Co., Ltd., Osaka, Japan
No Drawing. Filed Oct. 14, 1970, Ser. No. 80,800
Claims priority, application Japan, Oct. 14, 1969, 44/82,103
Int. Cl. C07c 69/76, 101/24, 129/08
U.S. Cl. 260—473 R      2 Claims

ABSTRACT OF THE DISCLOSURE

Novel quanidinocaproic acid phenyl esters of the formula

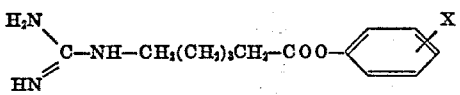

where X is, for example, hydrogen or halogen, and process for the production thereof, useful as antikallikrein, antitrypsin and antiplasmine agents.

---

This invention relates to novel guanidinocaproic acid phenyl esters and their production.

The novel guanidinocaproic acid phenyl esters are represented by the following general formula:

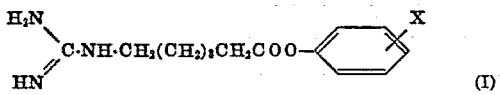

wherein X is a member selected from the group consisting of hydrogen atom, halogen atoms (i.e. Cl, Br, F and I), nitro radical, lower alkyl radical, lower alkoxy radical, carboxyl radical, hydroxy radical, carbethoxy radical and ε-guanidinocaproyloxy radical.

According to the invention, the compounds of the above General Formula I may be prepared by reacting the acid chloride of ε-guanidinocaproic acid with a phenol compound of the formula:

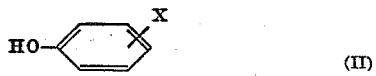

wherein X is as defined above, in the presence of a dehydrochlorinating agent.

The acid chloride of guanidinocaproic acid may be prepared in the usual manner well known in the art for the preparation of acid chlorides from carboxylic acids. Thus, guanidinocaproic acid is reacted with a chlorinating agent (such as $SOCl_2$, $POCl_3$, $PCl_3$, $PCl_5$) to prepare the acid chloride.

As for the dehydrochlorinating agent any known organic basic dehydrochlorinating agent such as pyridine, collidine, etc. may be used.

The esterifying reaction between the guanidinocaproic acid chloride and the phenol compound of the General Formula II is conducted in the presence of an inert non-polar organic solvent common to them such as tetrahydrofurane, benzene, toluene, etc.

Since the guanidinocaproic acid phenyl esters of the General Formula I are basic, it is convenient to convert the same into acid salts after the esterifying reaction but prior to isolation and purification. Examples of acids which can form acid salts with the guanidinocaproic acid phenyl esters are hydrochloric acid, sulfuric acid, oxalic acid, tartaric acid, toluene-sulfonic acid, etc. It is also possible to convert the guanidinocaproic acid into acid salt before it is converted into acid chloride or before it is reacted with the phenol compound.

The present invention will be further explained by the following examples.

EXAMPLE 1

7 g. of guanidinocaproic acid p-tosyl salt and 21 g. of thionyl chloride were mixed together to react at the room temperature. An endothermic reaction occurred and the caproic acid gradually dissolved. Then the reaction mixture was left standing for 1 to 2 hours and was extracted with 100 ml. of ether. The lower oily layer and the ether layer were separated from each other and the lower layer was repeatedly washed with ether. Then the oily substance (caproic acid chloride) was added with 2 g. of phenol in 50 ml. of tetrahydrofuran, and the mixture was stirred. After the mixture became a uniform solution, 2 g. of pyridine were gradually added. An exothermic reaction occurred and an oily substance came to be separated in the lower layer. After the completion of the reaction, the oily substance was washed with water and then recrystallized from hot water once or twice. Thus guanidinocaproic acid phenyl-p-tosyl salt was obtained as white crystals having a melting point of 101 to 103° C. The elementary analysis (as $C_{20}H_{27}N_3O_5S$) was as follows:

Found (percent): C, 56.87; H, 6.34; N, 9.84. Calculated (percent): C, 56.99; H, 6.46; N, 9.97.

EXAMPLES 2–10

In a manner similar to Example 1 the following compounds (as p-tosyl salts) were prepared:

$$\underset{HN}{\overset{H_2N}{\diagdown}}C-NHCH_2(CH_2)_3CH_2COO-\!\!\!\left\langle\!\!\!\!\!\begin{array}{c}\\ \\ \end{array}\!\!\!\!\!\right\rangle\!\!-X$$

| Example | X | Melting point (° C.) |
|---|---|---|
| 2 | H | 101–103 |
| 3 | Cl | 108–110 |
| 4 | $NO_2$ | 114–115 |
| 5 | $CH_3$ | 108–109 |
| 6 | $CH_3O$ | 112–114 |
| 7 | COOH | 186–188 |
| 8 | OH | 111–113 |
| 9 | $C_2H_5OCO$ | 130–133 |
| 10 | $\underset{HN}{\overset{H_2N}{\diagdown}}CNHCH_2(CH_2)_3CH_2COO$ | 172–174 |

The ε-guanidinocaproic acid phenyl esters of the present invention are novel compounds. They have low toxicity (Table 1) and they have inhibitory action of the hydrolysis of N-tosyl-L-arginin methyl ester by kallikrein, the hydrolysis of casein by trypsin and the fibrinogenolytic activity of plasmin (Tables 2, 3, 4). Further they have inhibitory action of capillary permeability of histamin, serotonin, bradykinin and kallikrein in albino guinea pig (Table 5).

Therefore, the esters of this invention are useful for medicine as antikallikrein, antitrypsin and antiplasmine agents.

TABLE 1

| Example: | $LD_{50}$ mg./kg. (mice ip.) |
|---|---|
| 2 | 190 |
| 3 | 178 |
| 4 | 118 |
| 5 | 227 |
| 6 | 212 |
| 7 | 200 |
| 8 | 112 |
| 9 | 156 |
| 10 | 129 |

TABLE 2.—INHIBITION OF THE ESTEROLYTIC ACTIVITY OF PLASMA KALLIKREIN

| Molar concentration of inhibitor | Percent of inhibition | | | | |
|---|---|---|---|---|---|
| | 0.5 mM. | 0.1 mM. | 0.05 mM. | 0.01 mM. | 0.005 mM. |
| Example: | | | | | |
| 2 | 94.6 | 80.5 | 71.5 | 31.7 | 20.6 |
| 3 | 100 | 90.0 | 82.6 | 59.5 | 42.0 |
| 4 | 100 | 97.0 | 94.5 | 81.0 | 51.0 |
| 5 | 100 | 89.0 | 80.6 | 38.0 | 12.7 |
| 6 | 100 | 85.5 | 73.9 | 46.4 | 30.3 |
| 7 | 72.0 | 37.5 | 21.8 | 14.0 | |
| 8 | 92.0 | 74.0 | 53.2 | 25.8 | 11.3 |
| 9 | 100 | 97.0 | 87.0 | 67.7 | 42.2 |
| 10 | 100 | 94.8 | 92.5 | 73.2 | 51.0 |
| Trasylol [1] | 8.2 | 5.5 | 0 | 0 | 0 |
| | [2] (5 KIU) | (1 KIU) | (0.5 KIU) | (0.1 KIU) | (0.05 KIU) |

[1] Commercial product of Bayer.
[2] KIU = Kallikrein Inhibitor Unit.

TABLE 3.—INHIBITION OF THE CASEINOLYTIC ACTIVITY OF TRYPSIN

| Molar concentration of inhibitor | Percent of inhibition | | | | |
|---|---|---|---|---|---|
| | 1 mM. | 0.5 mM. | 0.1 mM. | 0.05 mM. | 0.01 mM. |
| Example: | | | | | |
| 2 | 91.8 | 83.7 | 48.3 | 32.7 | 2.5 |
| 3 | 96.6 | 89.4 | 73.6 | 63.2 | 27.7 |
| 4 | 96.2 | 93.6 | 87.6 | 84.3 | 51.7 |
| 5 | 95.4 | 91.6 | 63.5 | 39.5 | 18.0 |
| 6 | 98.0 | 88.4 | 45.0 | 35.5 | 6.5 |
| 7 | 97.4 | 89.0 | 61.6 | 41.3 | 15.7 |
| 8 | 94.5 | 82.0 | 47.2 | 30.3 | 2.2 |
| 9 | 96.3 | 95.6 | 94.0 | 90.5 | 62.6 |
| 10 | 100 | 97.1 | 93.5 | 90.6 | 71.4 |
| Trasylol [1] | 83.0 | 35.8 | 12.2 | | |
| | [2] (10 KIU) | (5 KIU) | (1 KIU) | | |

[1] Commercial product of Bayer.
[2] KIU = Kallikrein Inhibitor Unit.

TABLE 4.—INHIBITION OF THE FIBRINOGENOLYTIC ACTIVITY OF PLASMIN

| Molar concentration of inhibitor | Percent of inhibition | | | | |
|---|---|---|---|---|---|
| | 1 mM. | 0.5 mM. | 0.1 mM. | 0.05 mM. | 0.01 mM. |
| Example: | | | | | |
| 2 | 100 | 83.5 | 32.6 | 15.8 | |
| 3 | 100 | 100 | 84.0 | 63.0 | 21.2 |
| 4 | 100 | 100 | 93.0 | 83.5 | 40.5 |
| 5 | 97.5 | 96.0 | 57.5 | 42.5 | 10.2 |
| 6 | 92.5 | 89.5 | 63.5 | 45.5 | 7.5 |
| 7 | 100 | 97.0 | 71.3 | 53.2 | 13.4 |
| 8 | 94.6 | 90.3 | 34.2 | 15.8 | 8.5 |
| 9 | 100 | 100 | 90.2 | 82.0 | 39.5 |
| 10 | 100 | 100 | 89.5 | 70.5 | 32.6 |
| Trasylol [1] | 80.7 | 29.7 | 19.9 | | |
| | [2] (10 KIU) | (5 KIU) | (1 KIU) | | |

[1] Commercial product of Bayer.
[2] KIU = Kallikrein Inhibitor Unit.

TABLE 5.—INHIBITORY EFFECTS OF p-CARBETHOXY-PHENYL-GUANIDINO CAPROATE ON CAPILLARY PERMEABILITY IN GUINEA PIG

| Dose, mg./kg. i.p. | Percent inhibition | | | |
|---|---|---|---|---|
| | Histamine | Serotonin | Bradikinin | Kallikrein |
| 50 | 0 | 0 | 15 | 17 |
| 100 | 33 | 34 | 33 | 29 |
| 200 | 59 | 50 | 53 | 60 |

From the foregoing, it will be readily appreciated that the novel compounds of this invention can be administered by various routes at various dosage levels. Thus, the compounds may be administered either orally or by injection. In the event an oral route is chosen, the dosage, in general terms, may range from 100 to 600 mg. per day for a human adult, while for administration by injection, a general dosage of 50 to 500 mg. is acceptable. In both cases, it is preferable to administer the compounds 2 or 3 times per day.

As a more specific example of how to use the compounds, they may be orally administered to a human adult at a dosage of 150 mg. twice a day, i.e., a total of 300 mg. per day.

The compounds may take any form suitable for therapeutic use, e.g., tablet, powder, capsule, aqueous solution, oily solution, etc. Furthermore, they may be utilized with a pharmaceutically acceptable carrier such as lactose, starch, water, non-toxic oil, etc.

What we claim is:
1. A compound of the formula

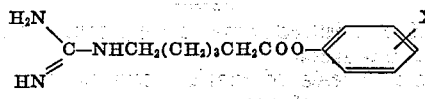

wherein X is carbethoxy.

2. A compound of the formula

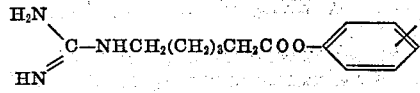

wherein X is ε-guanidinocaproyloxy.

References Cited

FOREIGN PATENTS 1,804,999    5/1969    Germany _____ 260—482 R

OTHER REFERENCES

Moller: Chemistry of Organic Compounds, p. 161.

LORRAINE A. WEINBERGER, Primary Examiner

P. J. KILLOS, Assistant Examiner

U.S. Cl. X.R.

260—479 S, 482 R, 544 Y; 424—311, 308